(12) United States Patent
Brothers et al.

(10) Patent No.: US 11,423,311 B2
(45) Date of Patent: Aug. 23, 2022

(54) AUTOMATIC TUNING OF ARTIFICIAL NEURAL NETWORKS

(71) Applicant: Samsung Electronics Co., Ltd., Gyeonggi-Do (KR)

(72) Inventors: John W. Brothers, Calistoga, CA (US); Joohoon Lee, East Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 1812 days.

(21) Appl. No.: 15/154,650

(22) Filed: May 13, 2016

(65) Prior Publication Data

US 2016/0358070 A1    Dec. 8, 2016

Related U.S. Application Data

(60) Provisional application No. 62/196,699, filed on Jul. 24, 2015, provisional application No. 62/174,472, filed on Jun. 11, 2015, provisional application No. 62/171,172, filed on Jun. 4, 2015.

(51) Int. Cl.
*G06N 3/08* (2006.01)
*G06N 3/04* (2006.01)

(52) U.S. Cl.
CPC .......... *G06N 3/082* (2013.01); *G06N 3/0454* (2013.01)

(58) Field of Classification Search
CPC ..................... G06N 3/082; G06N 3/0454
See application file for complete search history.

(56) References Cited

U.S. PATENT DOCUMENTS

| | | | |
|---|---|---|---|
| 6,125,194 A | 9/2000 | Yeh et al. | |
| 6,988,056 B2 | 1/2006 | Cook | |
| 7,308,134 B2 | 12/2007 | Wersing et al. | |
| 7,490,071 B2 | 2/2009 | Milenova et al. | |
| 7,813,822 B1 | 10/2010 | Hoffberg | |
| 8,000,928 B2 | 8/2011 | Scott et al. | |
| 8,209,269 B2 | 6/2012 | Schoelkopf et al. | |
| 8,452,109 B2 | 5/2013 | Alldrin et al. | |
| 8,532,753 B2 | 9/2013 | Makdissi | |
| 8,832,004 B2 | 9/2014 | Kato et al. | |
| 8,872,909 B2 | 10/2014 | Kumar et al. | |
| 8,873,838 B2 | 10/2014 | Suleyman et al. | |
| 2002/0133721 A1* | 9/2002 | Adjaoute | G06Q 20/04 726/23 |
| 2003/0002731 A1 | 1/2003 | Mersing et al. | |
| 2004/0220782 A1 | 11/2004 | Cook | |
| 2007/0005525 A1* | 1/2007 | Collette, III | G06N 3/0454 706/15 |

(Continued)

OTHER PUBLICATIONS

Jaderberg et al. (Speeding up Convolutional Neural Networks with Low Rank Expansions, May 2014, pp. 1-12) (Year: 2014).*

(Continued)

*Primary Examiner* — George Giroux
(74) *Attorney, Agent, or Firm* — Renaissance IP Law Group LLP

(57) ABSTRACT

Tuning a neural network may include selecting a portion of a first neural network for modification to increase computational efficiency and generating, using a processor, a second neural network based upon the first neural network by modifying the selected portion of the first neural network while offline.

14 Claims, 7 Drawing Sheets

(56) References Cited

U.S. PATENT DOCUMENTS

| | | | |
|---|---|---|---|
| 2008/0091428 A1* | 4/2008 | Bellegarda | G10L 13/06 |
| | | | 704/254 |
| 2010/0316283 A1 | 12/2010 | Greer | |
| 2012/0078099 A1 | 3/2012 | Suri | |
| 2013/0212053 A1* | 8/2013 | Yagi | G06N 3/063 |
| | | | 706/31 |
| 2014/0081895 A1 | 3/2014 | Coenen et al. | |
| 2014/0156576 A1 | 6/2014 | Nugent | |
| 2014/0357312 A1 | 12/2014 | Davis et al. | |
| 2014/0358831 A1 | 12/2014 | Adams et al. | |
| 2015/0019468 A1 | 1/2015 | Nugent et al. | |
| 2015/0055821 A1 | 2/2015 | Fotland | |
| 2015/0077323 A1 | 3/2015 | Ramaswamy et al. | |
| 2015/0125049 A1 | 5/2015 | Taigman et al. | |
| 2015/0161995 A1 | 6/2015 | Sainath et al. | |
| 2015/0193718 A1 | 7/2015 | Shaburov et al. | |
| 2015/0242747 A1* | 8/2015 | Packes | G06N 3/0454 |
| | | | 706/17 |

OTHER PUBLICATIONS

Anwar et al. (Fixed Point Optimization of Deep Convolutional Neural Networks for Object Recognition, Apr. 2015, pp. 1131-1135) (Year: 2015).*

Suzuki et al. (A Simple Neural Network Pruning Algorithm with Application to Filter Synthesis, Feb. 2001, pp. 43-53) (Year: 2001).*

* cited by examiner

AUTOMATIC TUNING OF ARTIFICIAL NEURAL NETWORKS

CROSS-REFERENCE TO RELATED APPLICATIONS

This application claims the benefit of U.S. Provisional Patent Application No. 62/196,699 filed on Jul. 24, 2015, U.S. Provisional Patent Application No. 62/171,172 filed on Jun. 4, 2015, and U.S. Provisional Patent Application No. 62/174,472 filed on Jun. 11, 2015, each being fully incorporated herein by reference.

TECHNICAL FIELD

This disclosure relates to artificial neural networks and, more particularly, to automated tuning of artificial neural networks.

BACKGROUND

Artificial neural networks, or simply "neural networks," refer to a computational architecture modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzman Machines, etc. In a feedforward neural network, the neurons of the neural network have links to other neurons. The links only extend in one direction, i.e., the forward direction, through the neural network.

A neural network may be used to extract "features" from complex input data. The neural network may include a plurality of layers. Each layer may receive input data and generate output data by processing the input data to the layer. The output data may be a feature map of the input data that the neural network generates by convolving an input image or a feature map with convolution kernels. Initial layers of a neural network may be operative to extract low level features such as edges and/or gradients from an input such as an image. Subsequent layers of the neural network may extract progressively more complex features such as eyes, a nose, or the like.

SUMMARY

One embodiment includes a method of tuning a neural network. The method includes selecting a portion of a first neural network for modification to increase computational efficiency and generating, using a processor, a second neural network based upon the first neural network by modifying the selected portion of the first neural network while offline.

Another embodiment includes an apparatus for tuning a neural network. The apparatus includes a memory storing program code and a processor coupled to the memory. The processor is configured to initiate operations responsive to executing the program code. The operations include selecting a portion of a first neural network for modification to increase computational efficiency and generating a second neural network based upon the first neural network by modifying the selected portion of the first neural network while offline.

A computer program product includes a computer readable storage medium having program code stored thereon for tuning a neural network. The program code is executable by a processor to perform operations. The operations include selecting a portion of a first neural network for modification to increase computational efficiency and generating a second neural network based upon the first neural network by modifying the selected portion of the first neural network while offline.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

Figure 1:
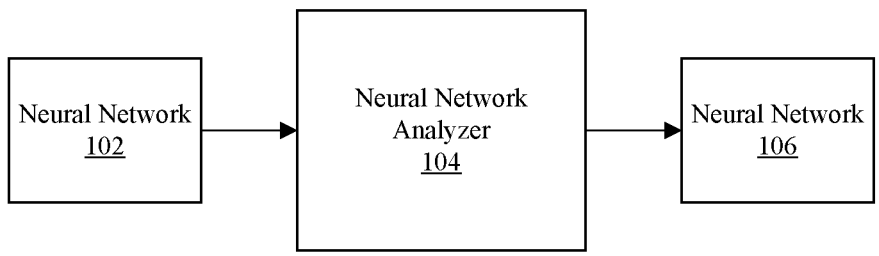
FIG. 1 is a diagram illustrating an example framework for automatic tuning of parameters of a neural network.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to artificial neural networks (ANNs) and, more particularly, to automated tuning of artificial neural networks (hereafter "neural networks"). Neural networks are being designed for wide variety of applications. Designing a neural network optimized for target hardware, however, is challenging. The design process requires an in depth knowledge of the application and insight about the network parameters and the hardware architecture used to execute the neural network. The manual process of figuring out the layer topology, convolution kernel dimensions, activation function, and required numerical precision of math operations, for example, can be costly.

Methods and systems to modify and/or optimize neural networks are described herein that automatically tune neural network parameters to achieve required performance. The term "performance," may be used herein in describing certain aspects of operation of a neural network such as accuracy of the neural network, runtime of the neural network, computational efficiency of the neural network, throughput, and/or power consumption of the neural network as implemented and/or executed for a target application on target hardware. Performance objectives for operation of a neural network may be expressed as one or more performance requirements. For example, a neural network for an Advanced Driver Assistance System (ADAS) application to be run on a particular mobile hardware core may have performance requirements that the application execute at a particular number of frames per second (e.g., 10, 60, or 120) and consume under 2 watts of power.

Example embodiments include a framework that automatically tunes parameters of an input neural network and outputs a modified (e.g., optimized) neural network. Example embodiments further include a method of determining tuned parameters for a neural network. In one arrangement, opportunities for modifying a neural network may be identified. The neural network may be modified based upon the identified opportunities. Examples of different modifications that may be applied to a neural network include, but are not limited to, pruning, decomposition, precision and/or numerical format modification, convolution kernel substitution, activation function substitution, kernel fusion, and/or scaling. The modified neural network may be validated to determine whether the modified neural network meets established performance requirements.

In one embodiment, the modified neural network may be retrained. In an alternative embodiment, retraining the neural network may be omitted. In another embodiment, a feedback network analysis result of the modified neural network may be generated to revise the original neural network as opposed to using the automated tool exclusively. In an alternative embodiment, generation of a feedback network analysis result may be omitted. In still another embodiment, the neural network may be iteratively modified and retrained. In an alternative embodiment, iteratively modifying and/or retraining the neural network may be omitted. Further aspects of the inventive arrangements are described in greater detail below with reference to the figures.

FIG. 1 is a diagram illustrating an example framework 100 for automatic tuning of parameters of a neural network. Framework 100 includes a neural network 102 (e.g., a first neural network), a neural network analyzer 104, and a neural network 106 (e.g., a second or "modified" neural network). Neural network analyzer 104 receives or accesses neural network 102 as an input and generates neural network 106 as an output. Neural networks 102, 106 can be received as an electronic signal through a communication channel and/or stored in a file or in memory as a functional data structure. Neural network 106 can represent a modified, or optimized, version of neural network 102. In an example embodiment, the parameters for neural network 102 are automatically tuned by neural network analyzer 104 using the example methods described within this disclosure. Neural network analyzer 104 may operate on neural network 102 to generate neural network 106 as an offline process. An "offline" process, for example, is one that is performed while not executing the neural network in an application utilizing the neural network, as part of a system, for a service, for a user, or for a client device. As a further example, an offline process can correspond to a process that is not executed in a real-time environment.

The term "neural network," as used within this disclosure, means a programmatic description or definition of a neural network. The neural network programmatically defines parameters, connection weights, or other specifics of the architecture such as the number of neurons contained therein or the connectivity among the neurons. In one aspect, a neural network is specified using computer readable program instructions, e.g., as program code and data organized as a functional data structure, stored in a computer readable storage medium. The neural network can be organized in a number of layers, where the output of a first layer can be fed as input to the next layer.

In one aspect, neural network 102 is pre-trained. For example, neural network 102 may be trained to a point where the weights of the neural network have converged or substantially converged. In particular, a training process has determined a set of weights (e.g., convolution kernels) that provides the neural network with the desired input-output relationship. As an illustrative example, a learning process can adjust the weights of the neural network repeatedly to change the input-output relationship so that an input-output accuracy cost function is optimized. In this way, the goal of a training process is to change the input-output relationship of the neural network. Computational efficiency and/or power efficiency may not be considerations during the training process. The term "computational efficiency," as used within this disclosure, means the ability to perform operations as part of executing a neural network without wasting time or energy, where the operations include, but are not limited to, calculations (e.g., multiply, add, and so forth) and memory accesses. While power efficiency may be considered independently of computational efficiency, increased power efficiency may arise from increased computational efficiency of a system.

In contrast, the example embodiments described within this disclosure facilitate improving and/or optimizing the computational efficiency of the trained neural network while substantially maintaining the same input-output relationship of the trained neural network at least with respect to established performance requirements. In some cases, example embodiments may sacrifice input-output accuracy for better computational efficiency in accordance with the established performance requirements. For example, improved computational efficiency can result in improved, or reduced, runtime of the neural network and/or reduced power consumption.

Figure 2:
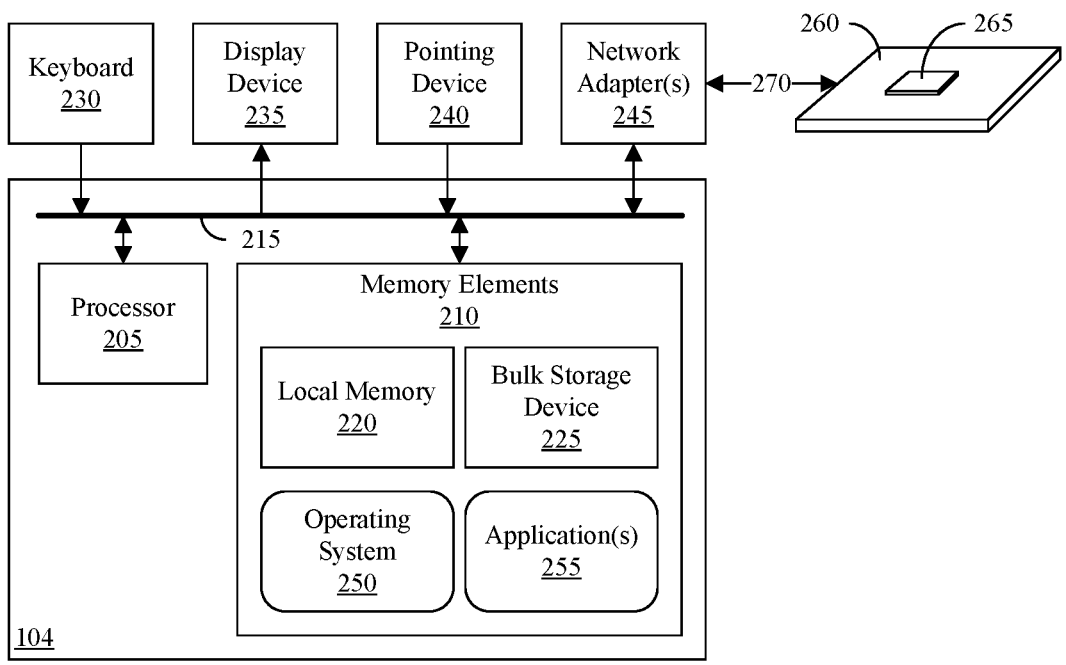
FIG. 2 is a block diagram illustrating an example implementation of the neural network analyzer of FIG. 1.

FIG. 2 is a block diagram illustrating an example implementation of neural network analyzer 104 of FIG. 1. As pictured, neural network analyzer 104 includes at least one processor 205 coupled to memory elements 210 through a system bus 215 or other suitable circuitry such as an input/output (I/O) subsystem. Neural network analyzer 104 stores program code within memory elements 210. Processor 205 executes the program code accessed from memory elements 210 via system bus 215. Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Neural network analyzer 104 may also include one or more cache memories (not shown) that provide temporary storage of at least some program code in order to reduce the number of times program code must be retrieved from bulk storage device 225 during execution.

Neural network analyzer 104 may be coupled to one or more I/O devices such as a keyboard 230, a display device 235, a pointing device 240, and/or one or more network adapters 245. Neural network analyzer 104 may include one or more additional I/O device(s) beyond the examples provided. The I/O devices described herein may be coupled to neural network analyzer 104 either directly or through intervening I/O controllers. In some cases, one or more of the I/O device(s) may be combined as in the case where a touch sensitive display device 235 (e.g., a touchscreen) is used. In that case, display device 235 may also implement keyboard 230 and/or pointing device 240.

Network adapter 245 is a communication circuit configured to establish wired and/or wireless communication links with other devices. The communication links may be established over a network or as peer-to-peer communication links. Accordingly, network adapter 245 enables neural network analyzer 104 to become coupled to other systems, computer systems, remote printers, and/or remote storage devices. Example network adapter(s) 245 may include, but are not limited to, modems, cable modems, Ethernet cards, bus adapters or connectors, wireless transceivers, whether short and/or long range wireless transceivers (e.g., cellular transceivers, 802.11x (Wi-Fi™) compatible transceivers, Bluetooth® compatible transceivers, and so forth).

As pictured, memory elements 210 may store an operating system 250 and one or more application(s) 255. In one aspect, operating system 250 and application(s) 255, being implemented in the form of executable program code, are executed by neural network analyzer 104 and, more particularly, by processor 205, to perform the various operations described within this disclosure. As such, operating system 250 and application(s) 255 may be considered an integrated part of neural network analyzer 104. Operating system 250, application(s) 255, and any data items used, generated, and/or operated upon by neural network analyzer 104 such as neural network 102 and/or neural network 106 are functional data structures that impart functionality when employed as part of neural network analyzer 104 or provided to a neural network engine or other processor for implementation and/or execution. For example, application 255 can include program code which causes processor 205 to perform one or more of the methods 300, 1000, or 1100 described herein and/or one or more of the operations of FIGS. 4, 5, 6, 7, 8, and/or 9 described herein. In this way, processor 205 is a special purpose processor for performing the functions defined by the one or more application(s) and/or application(s).

Neural network analyzer 104 may include fewer components than shown or additional components not illustrated in FIG. 2 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

In another arrangement, neural network analyzer 104 may be coupled to a platform 260 through a communication link 270. In one example, neural network analyzer 104 may be coupled to platform 260 through network adapter 245. In another example, neural network analyzer 104 may include one or more other I/O devices such as a Universal Serial Bus (USB) interface, or other communication port that may be used to couple neural network analyzer 104 to platform 260.

Platform 260 may be a circuit board or card and have target hardware such as a neural network accelerator 265 coupled thereto. In one arrangement, neural network accelerator 265 may be implemented as an integrated circuit (IC) or a plurality of interconnected ICs. For example, neural network accelerator 265 may be implemented as one or more programmable ICs such as field programmable gate arrays, one or more application-specific ICs (ASICs), processors, or the like. Neural network accelerator 265 is configured to implement or execute a neural network downloaded or otherwise provided thereto.

Neural network analyzer 104 may be configured to perform the operations described herein on a first neural network to generate a second neural network, e.g., a modified version of the first neural network. Neural network analyzer 104 further may provide the second neural network, e.g., a definition of the modified neural network, to neural network accelerator 265 for implementation and/or execution therein.

In one or more embodiments, the modified neural network may be optimized to run on neural network accelerator 265. For example, modifications to the first neural network may be specific to the architecture of neural network accelerator 265. In another example, the modifications may be general and not specific to the architecture of neural network accelerator 265.

Figure 3:
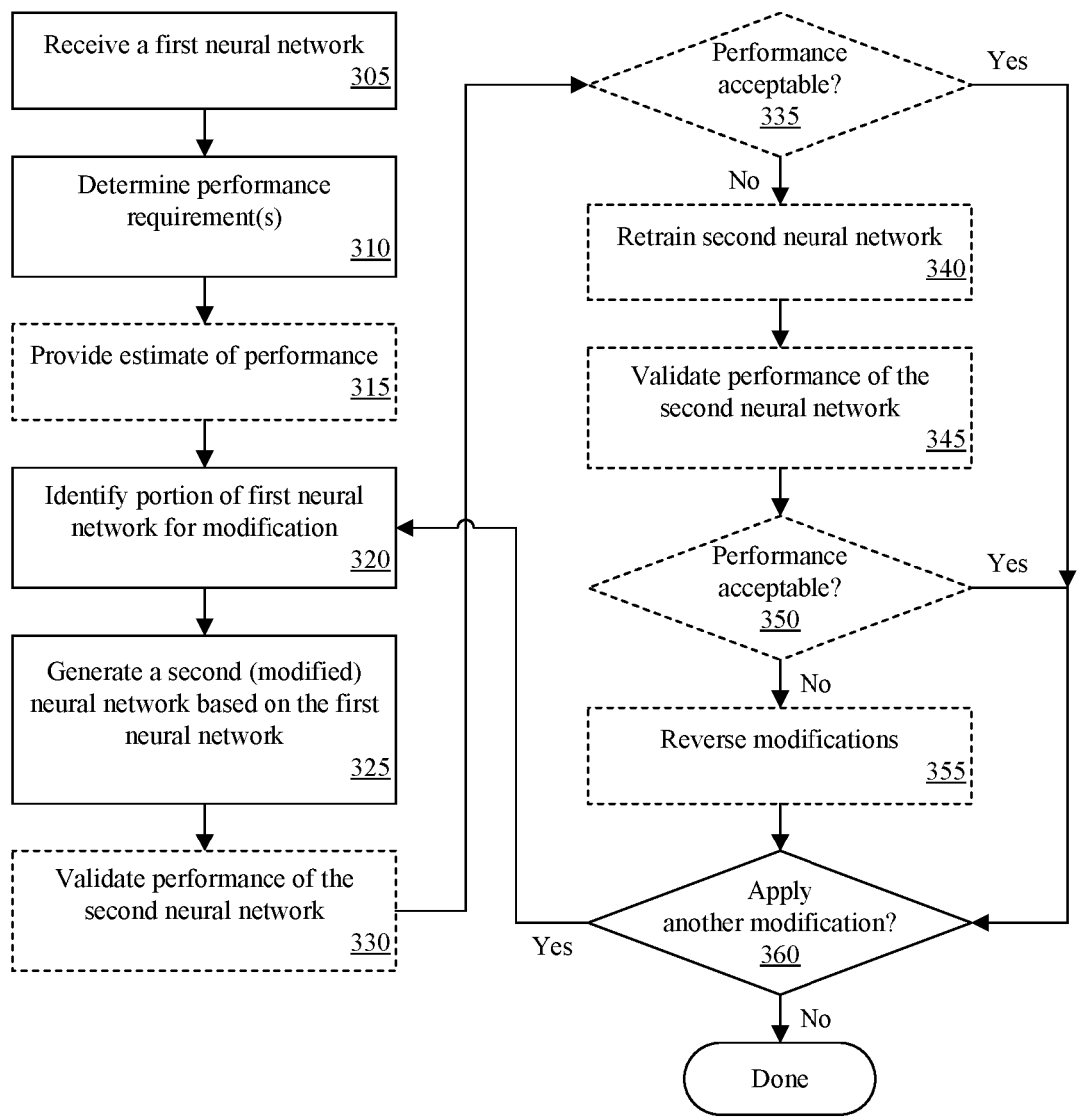
FIG. 3 is a flow chart illustrating an example method of tuning a neural network.

FIG. 3 is a flow chart illustrating an example method 300 of tuning a neural network. Method 300 may be implemented by neural network analyzer 104 of FIGS. 1 and 2. As discussed, neural network analyzer 104 may access or receive neural network 102. Neural network analyzer 104 generates neural network 106 as an output as part of an offline process.

In block 305, the neural network analyzer receives a first neural network as an input. In one aspect, the neural network analyzer may receive or access the first neural network in response to a user request.

In block 310, the neural network analyzer determines data indicating one or more performance requirements. In one example, the neural network analyzer may obtain the performance requirements from a configuration file. In another example, the neural network analyzer may receive the performance requirements as one or more inputs from a user, e.g., through a user interface. The performance requirements specify allowable or expected objectives of the modified neural network. For example, the performance requirements may specify one or more necessary objectives of the modified neural network in terms of accuracy, runtime, power consumption, and/or a combination of the like. The performance requirements may specify the objectives in terms of minimum and/or maximum threshold(s) and/or acceptable increase(s) and/or decrease(s) in accuracy, runtime, and/or power consumption of the modified neural network compared to the first neural network received in block 305 for processing.

The data may specify different types of the one or more performance requirements. In one embodiment, the data may specify a power consumption requirement and/or a runtime requirement that may be countered with an acceptably lower accuracy requirement. In another embodiment, the data may indicate priority among the performance requirements. For example, one or more of the performance requirements may be specified as "hard." A "hard" performance requirement is one that must be met when evaluating the modified neural network. One or more other performance requirements may be "soft." A "soft" performance requirement is one that need not be met or that may be met within a given tolerance or range of the specified soft performance requirement, or that may be reduced (e.g., minimized) to the extent achievable while still meeting the hard performance requirement. Accordingly, the neural network analyzer can change the input neural network to meet one or more thresholds of selected performance requirements while minimizing other performance requirements.

In still another aspect, as part of block 310, the data may specify a level of aggressiveness in the modifications to be performed. In one embodiment, the data may specify whether the neural network analyzer is to be aggressive, medium, or conservative in applying modifications. In illustration, the aggressive setting for the neural network analyzer may permit a reduction in accuracy of the modified neural network compared to the first neural network in order to achieve improvement in some other aspect of performance of the modified neural network compared to the first neural network. As an example, the aggressive setting may allow a reduction in accuracy of the modified neural network if at least a minimum improvement in runtime, throughput, and/or power efficiency is achieved. The medium setting may also permit a reduction in accuracy in the modified neural network compared to the first neural network if improvement in one or more other aspects of performance of the modified neural network compared to the first neural network is achieved. The amount of reduction in accuracy and the amount of improvement in the other aspects of performance may be lower than that of the aggressive setting. The conservative setting may require that accuracy of the modified neural network not decrease from that of the first neural network while achieving improvement in one or more other aspects of performance of the modified neural network compared to the first neural network. An example of a processing technique that may be applied by the neural network analyzer to implement a conservative setting is kernel fusion. In one embodiment, kernel fusion refers to a processing technique where the neural network analyzer fuses, or combines, two kernels (convolution and activation) together to eliminate unnecessary memory accesses.

Further, it should be appreciated that the level of aggressiveness may be specified on a per-modification type basis. For example, the data may specify a threshold for modifying weights on convolution kernels, e.g., zeroing weights, that is aggressive while other modifications such as scaling may not be applied in an aggressive manner, e.g., be applied using the medium or conservative setting(s).

In block 315, the neural network analyzer may provide an estimate of the performance of the first neural network in its current form. In one embodiment, the neural network analyzer may estimate metrics such as the power consumption of the neural network, the runtime for the neural network, and so forth based upon the received programmatic description and the target hardware to be used to execute the neural network. In one example, the neural network analyzer may use a worst-case analysis that presumes full execution of each neuron of the neural network.

In one example embodiment, the neural network analyzer determines whether the performance estimated in block 315 satisfies the requirements determined at block 305 (not shown). If so, method 300 may end.

In block 320, the neural network analyzer identifies a portion of the first neural network for modification. The neural network analyzer may analyze the first neural network and identify opportunities for modification. For example, the neural network analyzer may analyze the first neural network and identify a portion of the first neural network for modification to improve performance. In analyzing the first neural network, the neural network analyzer may use one or more different types of analysis and/or modifications. Examples of different modification types that may be applied to the first neural network include, but are not limited to, pruning, decomposition, precision and/or numerical format modification, convolution kernel substitution, activation function substitution, and/or scaling. The various types of analysis used to identify portions of the first neural network for modification and the types of modifications that may be implemented by the neural network analyzer in performing blocks 320 and/or 325 are described within this disclosure in greater detail below with reference to FIGS. 4-11.

In one embodiment, the neural network analyzer may select one modification type and analyze the first neural network for portion(s) of the first neural network that may be modified using the selected modification type. In this regard, method 300 may be performed in an iterative manner where the neural network analyzer analyzes the first neural network for portions to be modified using different modification types in different iterations. For example, in a first iteration, the neural network analyzer may analyze the first neural network to perform pruning and apply the pruning to selected portions (as described below in greater detail), in a second iteration, the neural network analyzer may analyze the (now second) neural network to perform convolution kernel substitution and apply the substituted convolution kernels to selected portions, then scaling, and so forth.

In an example embodiment, the neural network analyzer determines modification types and rules for applying the modification types. For example, a configuration data file may indicate an order of the modifications to be applied during the method 300.

In block 325, the neural network analyzer generates a second neural network based on the first neural network received as input in block 305. In one embodiment, the neural network analyzer generates the modified neural network by modifying one or more portions of the first neural network or a copy thereof. For example, the neural network analyzer can modify the portion of the first neural network identified in block 320. The neural network analyzer may apply a selected modification type to the portion of the first neural network identified in block 320 resulting in the second neural network. As discussed, the second neural network is output and may be considered a modified version of the first neural network.

In block 330, the neural network analyzer may validate performance of the second neural network. The neural network analyzer may validate any of a variety of different aspects of performance. For example, the neural network analyzer may validate any performance requirements that may be specified. In one embodiment, the neural network analyzer performs validation by forward propagating validation test sets. The neural network analyzer may be configured to perform validation automatically.

In block 335, the neural network analyzer may determine whether the performance of the second neural network is acceptable. In one arrangement, the neural network analyzer may compare the performance of the second neural network with the performance of the first neural network. For example, the neural network analyzer may automatically run the same validation test sets on the first neural network and the second neural network. The neural network analyzer may compare any of the metrics described herein such as the prediction value, power consumption, and/or runtime between the two neural networks to compute the difference. If the difference is greater than a desired threshold, e.g., as specified by one or more of the performance requirements, then the performance of the modified neural network is not acceptable.

As method 300 iterates, the neural network analyzer may compare the performance of the modified neural network with the performance of the neural network in existence immediately prior to the current modification (e.g., the neural network as modified from the immediately prior iteration of method 300). The neural network analyzer may perform the comparison to ensure that performance of the second neural network has not been compromised or reduced more than a permissible amount, e.g., meets the specified performance requirements.

In another embodiment, the neural network analyzer may determine whether the amount of improvement in one or more performance metrics is sufficient. In cases where the performance of the modified neural network does not improve or does not improve by a predetermined amount, the neural network analyzer may determine that the performance of the modified neural network is unacceptable.

If the performance of the modified neural network is not acceptable, method 300 may continue to block 340. If the performance of the modified neural network is acceptable, method 300 may proceed to block 360.

Continuing with block 340, the neural network analyzer may retrain the second neural network. In one aspect, the neural network analyzer may or may not retrain the second neural network based upon a user specified setting. In another aspect, the neural network analyzer may retrain the second neural network responsive to detecting a retraining condition such as not meeting a performance metric. In block 345, the neural network analyzer may validate the performance of the modified neural network. In block 350, the neural network analyzer may determine whether the performance of the modified neural network is acceptable. If so, the modifications to the neural network are retained and method 300 continues to block 360. If not, method 300 may proceed to block 355 where the neural network analyzer reverses the modification(s) implemented in block 325.

In block 360, the neural network analyzer may determine whether another modification type is to be applied. If so, method 300 may loop back to block 320 to identify another portion of the neural network for modification. It should be appreciated that further modifications may continue to build upon prior modifications. For example, during a subsequent iteration through method 300, further modifications are applied to the most recent state of the neural network so that modifications implemented in a subsequent iteration are applied to the neural network generated during the prior iteration.

In another aspect, method 300 may be performed iteratively to apply a same modification type in one or more further iterations. For example, the neural network analyzer may be configured to change no more than a predetermined amount of the neural network in any given iteration. In that case, the neural network analyzer may iterate through method 300 more than one time to apply a given modification type, e.g., convolution kernel substitution, to the neural network. For example, during a first iteration, the neural network analyzer may identify a first subset of convolution kernels for substitution and, during a subsequent iteration, identify a second and different set of convolution kernels for substitution. During further iterations, other types of analysis may be applied.

FIG. 3 is provided for purposes of illustration only and is not intended to limit the inventive arrangements described within this disclosure. In another example implementation, more than one type of modification may be applied in a single iteration.

Further, one or more operations represented by blocks of method 300 may be optional and, therefore, omitted. For instance, one or more or all of blocks 315, 330, 335, 340, 345, 350, and 355 may or may not be performed by the neural network analyzer. In one example, method 300 may perform block 325 and continue directly to block 360 skipping blocks 335-355. In another example, where the neural network analyzer does not perform retraining, method 300 may perform block 330 and continue directly to block 350 skipping blocks 330-345. It should be appreciated that various combinations of blocks 315, 330, 335, 340, 345, 350, and 355 may be included in method 300 to implement features such as validation, retraining, reversing modifications, and so forth.

In the following paragraphs, different modification types are described that the neural network analyzer may apply to a neural network in performing blocks 320 and/or 325. One example modification type is convolution kernel substitution. Deep convolutional neural networks (DCNN) can have a number of convolutional layers with different sizes of convolution kernels. Each convolution kernel is applied to the data in neighboring input feature maps and can consume a substantial amount of the computation time (e.g., 80-90% in an example case) for neural network execution. Such convolution kernels can be selected as candidates for optimization.

As defined within this specification, the term "convolution kernel substitution" means replacing a kernel of a neural network with a replacement convolution kernel that differs from the convolution kernel being replaced by at least one value, i.e., weight. The replacement convolution kernel may be equivalent to the selected convolution kernel or an approximation of the selected convolution kernel. The replacement convolution kernel uses fewer computations and/or consumes less memory than the selected convolution kernel. In one aspect, convolution kernel replacement may be an example of a modification that adjusts one or more weights of a portion of the neural network.

The neural network analyzer may scan the layers of the neural network to identify one or more convolution kernels that are candidates for convolution kernel substitution. In one example, the replacement convolution kernel may be a modified version of the convolution kernel selected for substitution. The neural network analyzer may evaluate the selected convolution kernel and, for weights of the selected convolution kernel that are less than a threshold value, change the weights to zero. In that case, the neural network analyzer generates a replacement convolution kernel that includes more zero weights than the selected convolution kernel thereby reducing the number of computations necessary for executing the modified neural network compared to the first neural network.

Figure 4:
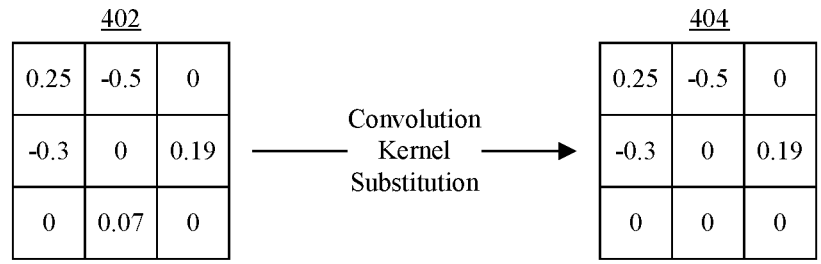
FIG. 4 is a diagram illustrating an example of convolution kernel substitution.

FIG. 4 is a diagram illustrating an example of convolution kernel substitution. FIG. 4 illustrates an example convolution kernel 402 having a plurality of weights. The neural network analyzer may replace convolution kernel 402 with replacement convolution kernel 404. Thus, the replacement convolution kernel has one or more weights that differ from the weights of the convolution kernel being replaced. In the example of FIG. 4, the weight of 0.07 in the middle of the bottom row in convolution kernel 402 is changed to a value of 0 in replacement convolution kernel 404.

FIG. 4 illustrates an example where a threshold may be specified so that weights that do not exceed the threshold are set to zero. In the example of FIG. 4, the threshold may be set to 0.1. The neural network analyzer may set any weight of a convolution kernel selected for convolution kernel substitution to zero if that weight does not exceed the 0.1 threshold. The neural network analyzer may apply convolution kernel substitution to one or more convolution kernels, convolution kernels in one or more particular layers, all convolution kernels, or apply another selection criterion. As noted, the threshold may be set according to data obtained from a user input or a configuration file. In this regard, the aggressiveness of the neural network analyzer, in terms of setting weights to zero for purposes of convolution kernel substitution, may be adjusted through adjustment of the threshold.

Figure 5:
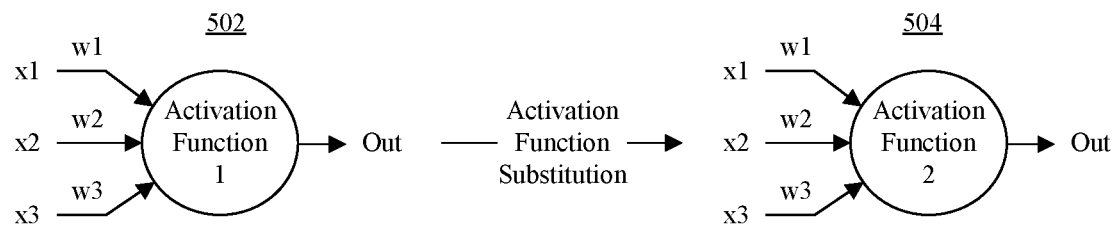
FIG. 5 is a diagram illustrating an example of activation function substitution.

Another example modification is activation function substitution. FIG. 5 is a diagram illustrating an example of activation function substitution. The neural network analyzer may scan the neural network to determine one or more activation functions of neurons that are candidates for replacing. The neural network analyzer may substitute a selected activation function of the neural network with a second, different activation function that improves one or more aspects of performance of the neural network. Referring to FIG. 5, the neural network analyzer replaces activation function 1 in neuron 502 with activation function 2 resulting in a modified version of neuron 502 shown as neuron 504.

For purposes of illustration, consider an example where the first neural network uses the Rectified Linear Unit (ReLU) activation function. ReLU provides simple calculation and a fast stochastic gradient descent (SGD) convergence during training. ReLU, however, may not be the most optimal activation function. In one embodiment, the neural network analyzer may identify instances of the ReLU activation function within the neural network and substitute the Parameterized ReLU (PReLU) activation function for the ReLU activation function thereby generating the modified neural network.

Another example modification is decomposition. The neural network analyzer may perform operations such as sparse decomposition, singular value decomposition, or the like. The neural network analyzer may decompose a selected convolution kernel into several separate matrix multiplication operations. The number of matrix multiply operations post decomposition is less than the total number of multiply-accumulate (MAC) operations needed to implement the convolution kernel pre-decomposition. The decomposition may be performed to exactly replicate the original convolution or to approximate the original convolution within a specified tolerance. In another example, the neural network analyzer can apply a low rank matrix approximation using singular value decomposition to reduce the number of operations required. In one aspect, decomposition may be an example of a modification that adjusts one or more weights of a portion of the neural network.

Figure 6:
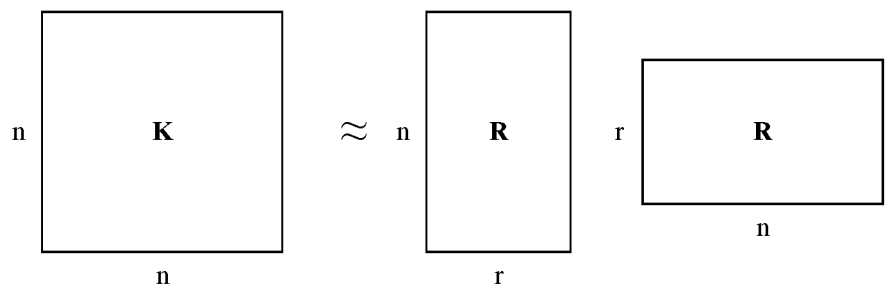
FIG. 6 is a diagram illustrating an example of singular value decomposition.

FIG. 6 is a diagram illustrating an example of singular value decomposition as performed by the neural network analyzer. In FIG. 6 a convolution kernel K is approximately equal to $RR^T$, where R is an n×r matrix where r<n. The convolution kernel K is decomposed into the two matrices R which results in fewer multiply-accumulate operations being performed in the second neural network.

Another example modification is kernel fusion. In one embodiment, the neural network analyzer may identify a convolution layer followed by a pooling layer or an activation layer. Responsive to identifying the convolution layer and subsequent layer, the neural network analyzer may combine the convolution layer and the subsequent layer (e.g., either a pooling layer or an activation layer) into one convolution kernel. Combining the layers into one convolution kernel reduces the number of memory accesses required for processing data through the now combined layer(s). Kernel fusion is an example of a conservative optimization where the exact calculation is preserved by the fused convolution kernel while reducing the number of memory accesses performed by a neural network execution system thereby improving computational efficiency and reducing power consumption.

Another example modification is pruning. The neural network analyzer may scan the neural network to determine a portion of the neural network that may be pruned. For example, the neural network analyzer may prune the neural network by removing, or reducing, layers or parts of the neural network parameters that do not substantially compromise the accuracy of the neural network. The neural network analyzer may prune in a number of ways.

In one arrangement, the neural network analyzer can prune a layer of the neural network that does not substantially affect output of the neural network. The neural network analyzer can prune (remove) one or more input feature maps of a layer that do not substantially affect the output feature map generated by the layer.

In another arrangement, the neural network analyzer may search for convolution kernels in which all components, e.g., weights, are less than a specified threshold. Any convolution kernels identified with all components less than the threshold may be removed, i.e., zeroed completely, or otherwise skipped. In general, convolution kernels that are zeroed and therefore skipped or removed may be determined by the neural network analyzer to have little, if any, effect on the output feature maps that are generated.

In one example, the neural network analyzer may be configured to detect a layer of the neural network where the weights are small, e.g., below a specified threshold. The threshold may be specified by data obtained from a configuration file, via user input, and so forth. In one example, the layer that is detected may be an identity layer. In any case, the neural network analyzer may select the detected layer as a candidate for pruning (e.g., removal from the neural network).

In another arrangement, pruning may include reducing the precision of a numerical format of one or more numerical values of the neural network. For example, the neural network analyzer can analyze one or more weights in a number of layers of the neural network to determine whether the precision of the numerical format used for the weights may be reduced. By reducing the precision of numerical formats used, lower precision arithmetic hardware may in turn be used. Lower precision arithmetic hardware can be more power efficient and can be built more densely than higher precision arithmetic hardware. For purposes of illustration, a neural network that uses the minimum number of bits required to represent the range and precision of the parameters can achieve higher performance (e.g., faster runtime and/or lower power consumption) than a neural network using a greater number of bits than required.

By reducing the precision through substitution of a different numerical format for a weight that is more efficient than the prior numerical format, the neural network analyzer may reduce the required storage for weights. In an example embodiment, the neural network analyzer analyzes the trained weights. In a number of cases, neural network training is performed using large scale server clusters leveraging CPU and/or GPUs. CPUs and GPUs can be designed to perform 32-bit or 16-bit floating point number arithmetic operations. As such, the trained neural network parameters may be stored in 32-bit or in 16-bit floating point format. The neural network analyzer can scan through a portion of the weights or all of the weights, determine the minimum and maximum values for the weights, and determine the range. Additionally or alternatively, the neural network analyzer can determine the distributions of the values of the weights to determine a level of precision for the selected weights to sufficiently represent the range of weights.

In a number of example cases, a number of the weights (e.g., the majority of the weight values) can be centered around zero, thus providing opportunity to use more compact number representation format. For example, a 12-bit fixed point number may be sufficient to represent all the trained weights without losing substantial information. In this regard, in one arrangement, reducing precision of a data type may not reduce the accuracy of the neural network. For example, superfluous bits not needed to represent the number may be eliminated without reducing accuracy of the second neural network. In other cases, however, reducing precision of a data type may reduce the accuracy of the second neural network. In one aspect, pruning, or at least one or more operations that may be included in pruning to the extent that weights or weight representations are changed, may be an example of a modification that adjusts one or more weights of a portion of the neural network.

Figure 7:
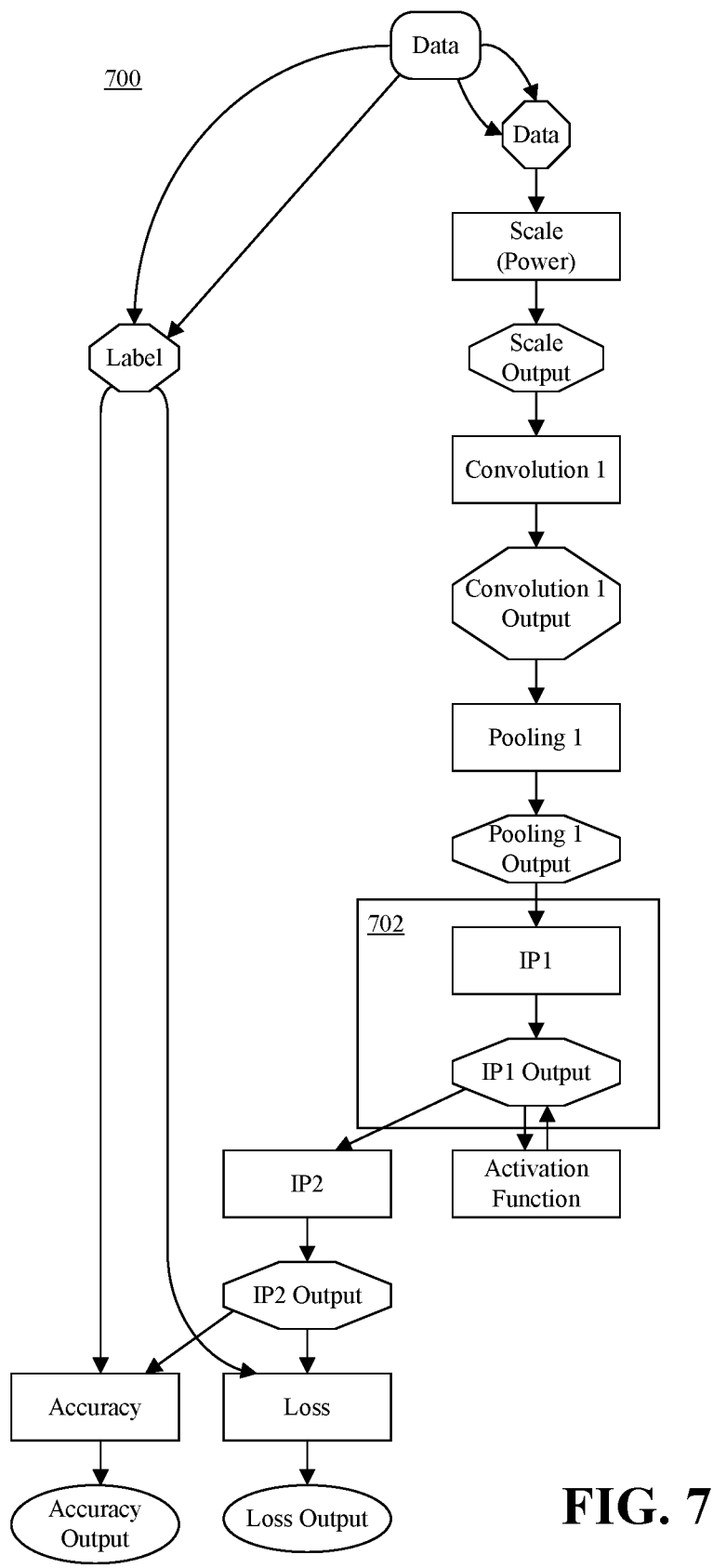
FIGS. 7 and 8 are diagrams that, taken collectively, illustrate an example of pruning a layer of a neural network.
Figure 8:
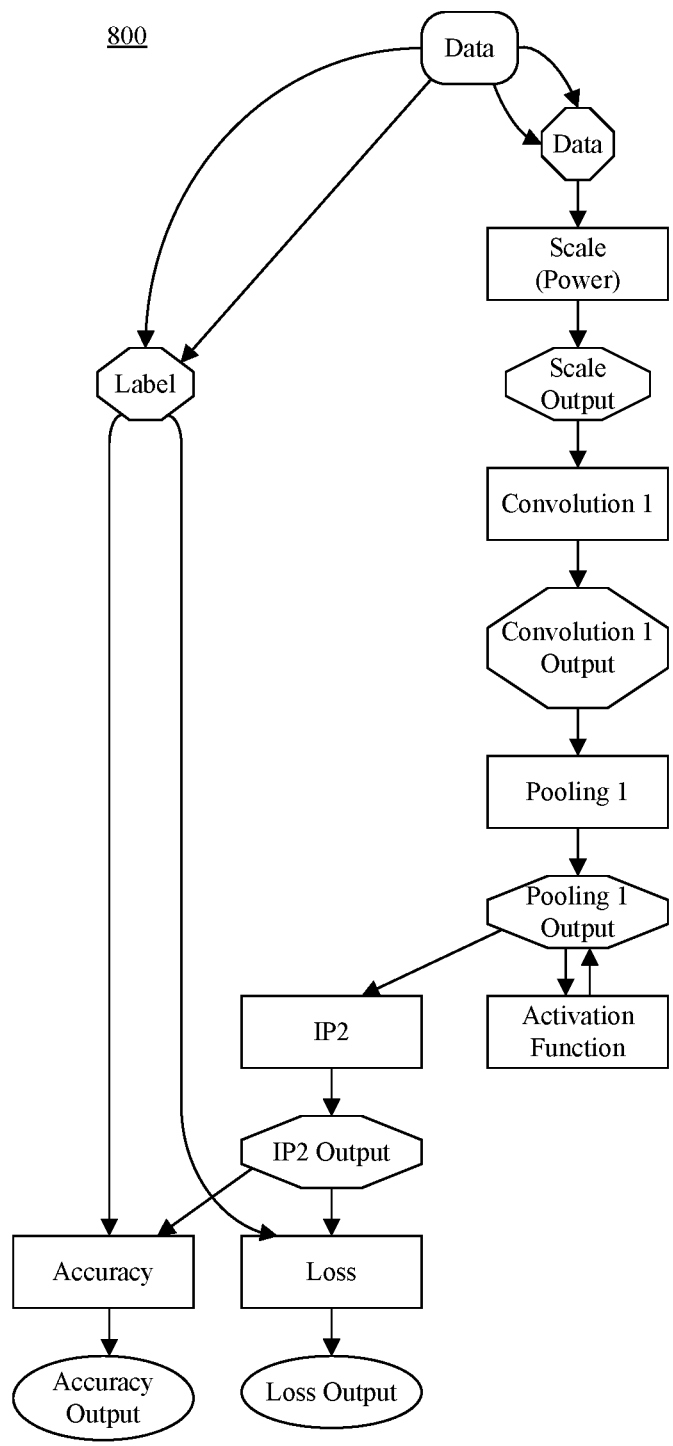

FIGS. 7 and 8 are diagrams that, taken collectively, illustrate an example of pruning a selected portion of a neural network 700 to generate a modified neural network. More particularly, FIGS. 7 and 8 illustrate the pruning of a layer of neural network 700 to generate the modified neural network. Referring to example neural network 700 of FIG. 7, the neural network analyzer has identified a sub-process, or layer, 702 as a candidate for pruning. Accordingly, the neural network analyzer may remove sub-process 702 from neural network 700.

FIG. 8 is a diagram illustrating the modified neural network after the pruning shown in FIG. 7. In FIG. 8, sub-process 702 has been removed resulting in the second neural network. In an example embodiment, the neural network analyzer performs the pruning process and selects sub-process 702 for pruning based on a determination that the sub-process 702 has little or no substantial effect on the output of the neural network. The neural network analyzer, for example, may determine that accuracy and loss of neural network 800 after pruning are within acceptable limits of accuracy and loss specified by the performance requirements compared to neural network 700 prior to pruning.

Another example modification is scaling. As generally known, a neural network processes input data by calculating a number of feature maps. The neural network analyzer may determine whether the calculation of different feature maps use similar feature map calculations. The neural network analyzer may determine whether the calculation of different feature maps is substantially the same or is the same. The calculation of different feature maps, for example, may differ by a scale factor. In that case, the neural network analyzer can replace the separate operations by performing one operation and then scaling the result to obtain an approximation of the result of the second operation. In one aspect, scaling, or at least one or more operations included in scaling, may be an example of a modification that adjusts one or more weights of a portion of the neural network.

For purposes of illustration, consider an example where the neural network being modified processes input RGB (Red, Green, Blue) image data by calculating the feature maps for the R plane, the G plane, and the B plane separately. In one arrangement, the neural network analyzer can determine whether the feature map calculations for the R-plane, the G-plane, and the B-plane are substantially similar (e.g., substantially differing by a scale factor). Based on a determination that the feature map calculations are similar, the neural network analyzer can replace the separate RGB operations by combining scaled versions of the RGB planes and performing the feature map operations on the combined RGB image.

Figure 9:
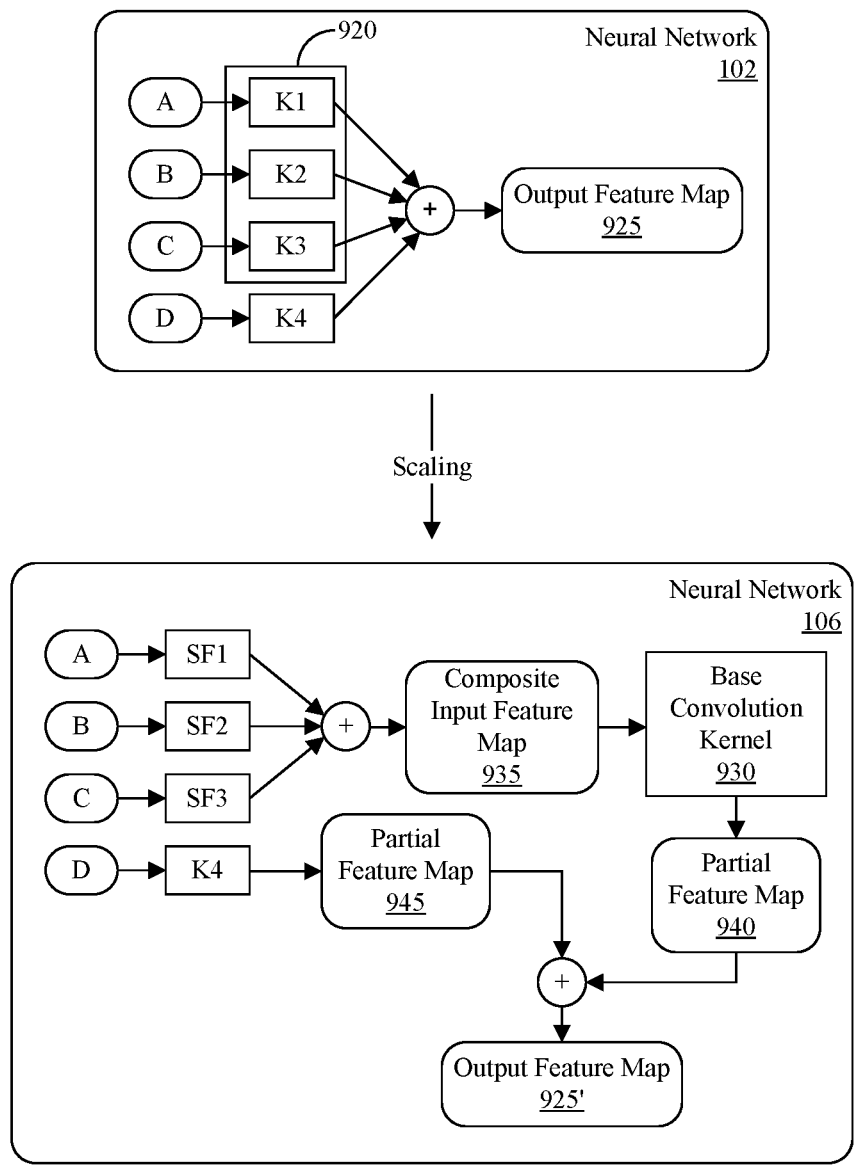
FIG. 9 is a block diagram illustrating an example of scaling.

FIG. 9 is a block diagram illustrating an example of scaling as performed by the neural network analyzer. For purposes of illustration, consider an example where neural network 102 includes, at least in part, two sets of 192 convolution kernels. The convolution kernels are 3×3. In this example, neural network 102 is trained without any constraints for determining correlations with other convolution kernels. Neural network 106, as generated by the neural network analyzer, will not include the identical 2 sets of 192 convolution kernels. Rather, neural network 106 will include one or more base convolution kernels and scaling factors.

In one arrangement, the neural network analyzer identifies groups of convolution kernels from neural network 102 that are considered similar, for example, based on a similarity criterion. More particularly, the neural network analyzer may identify one or more groups of similar convolution kernels from one or more convolution layers of neural network 102.

In the example of FIG. 9, neural network 102 includes a convolution layer in which input feature maps A, B, C, and D are processed by convolution kernels K1, K2, K3, and K4 respectively. The neural network analyzer has determined that convolution kernels K1, K2, and K3 are similar and formed a group 920. The results of applying convolution kernels K1, K2, K3, and K4 are summed to generate an output feature map 925. In this example, output feature map 925 may be represented by the expression: A*K1+B*K2+C*K3+D*K4.

The same convolution layer described for neural network 102 is also shown for neural network 106 post processing by the neural network analyzer. As pictured, the convolution layer is modified so that each of input feature maps A, B, and C, which belong to group 920, is multiplied by a scaling factor shown as SF1, SF2, and SF3, respectively. The scaled results are summed to generate a composite input feature map 935. Composite input feature map 935 may be expressed as SF1(A)+SF2(B)+SF3(C). Composite input feature map 935 is provided to base convolution kernel 930.

Base convolution kernel 930 is applied to composite input feature map 935 to generate partial feature map 940. Partial feature map 940 may be expressed as [SF1(A)+SF2(B)+SF3(C)]*BK, where "BK" is base convolution kernel 930. Convolution kernel K4, which is not similar to convolution kernels K1, K2, or K3, remains and is independently applied to input feature map D to generate partial feature map 945. Partial feature map 945 may be expressed as D*K4. Partial feature map 945 may be provided to the adder and summed with partial feature map 940 to generate output feature map 925'.

In the case where the convolution kernels K1, K2, and K3 are similar and scaled equivalents or transformations (hereafter collectively "scaled equivalents") of base convolution kernel 930, output feature map 925' is equivalent to output feature map 925. In the case where one or more or all of convolution kernels K1, K2, and K3 are similar but are approximate equivalents or approximate transformations (hereafter collectively referred to as "approximate equivalents") of base convolution kernel 930, then output feature map 925' is an approximation of output feature map 925. In any case, rather than perform a separate convolution operation for each of input feature maps A, B, and C, the input feature maps are scaled and summed to generate composite feature map 935, that may then be convolved with base convolution kernel 930. In general, the neural network analyzer may replace each of the convolution kernels of a group, e.g., convolution kernels K1, K2, and K3 of group 920, with a single instance of the base convolution kernel for the group.

In many cases, a neural network generates a feature map for a next layer by convolving multiple feature maps from the previous layer with convolution kernels. The results are then summed. Each input feature map may be used multiple times to generate several or all feature maps in the next layer. The relative importance of each input feature map is effectively folded into the convolution matrix applied to that feature map for a given output feature map. As such, the convolutions applied to a given feature map are often scaled versions of each other or approximately scaled versions of each other.

The neural network analyzer may leverage this characteristic by detecting these instances of similar convolution kernels and applying an optimization that may significantly reduce the number of multiply-accumulate (MAC) operations performed when executing neural network 106. For example, referring to neural network 102, in the case where the convolution kernels utilize a 3×3 convolution matrix, applying convolutions kernels K1, K2, and K3 would result in 27 (3×3×3) multiplies and adds. In the case of neural network 106, processing input feature maps A, B, and C through the modified convolution layer results in 12 (1+1+1+3×3) multiplies and adds. In general, the larger the number of input maps in the group and/or the larger the convolution matrix dimensions, the more significant the reduction in operations. Neural network 106 may consume less power and execute faster than neural network 102 with the same or nearly the same accuracy.

In general, FIG. 9 illustrates that after a neural network is trained and the convolution weights are determined, groups of similar convolution kernels are identified. Further, one or more base convolution kernels and scaling factors may be computed. The scaling factors and base convolution kernels may be used directly to execute the neural network as an approximation of the original trained neural network. In another aspect, retraining may be performed on the re-parameterized neural network. As part of the retraining, the neural network may be redefined in terms of base convolution kernels, scaling factors, and the convolution weights. The weights of the base convolution kernels and the scaling factors may be refined as a result of the retraining. In addition, other network parameters such as the weights of the fully connected layers may be refined. The result of the retraining may be a neural network that is a close approximation of the original neural network. The resulting neural network may be slightly less accurate or slightly more accurate, but may maintain the computational efficiencies of using the base convolution kernel(s) and scaling factors instead of the original separate convolution kernels.

Figure 10:
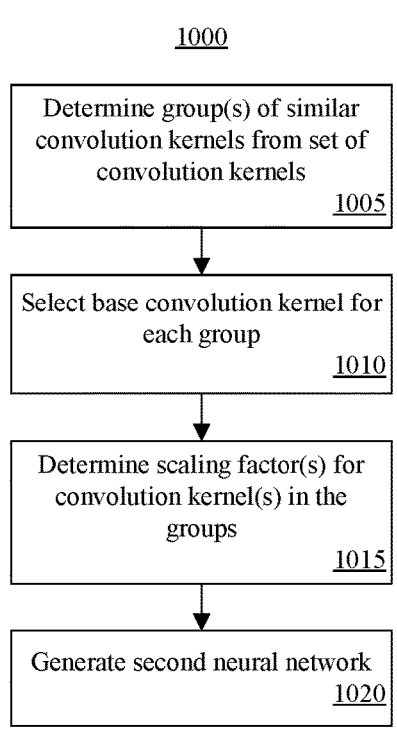
FIG. 10 is a flow chart illustrating an example method of scaling convolution kernels of a neural network.

FIG. 10 is a flow chart illustrating an example method 1000 of scaling convolution kernels of a neural network. Method 1000 may be performed by the neural network analyzer described with reference to FIGS. 1 and 2. For example, in one arrangement, method 1000 may be performed by the neural network analyzer to implement blocks 320 and/or 325 of FIG. 3.

In block 1005, the neural network analyzer may determine one or more groups of similar convolution kernels from a set of convolution kernels of the first neural network. For example, the neural network analyzer may determine one or more groups of similar convolution kernels for a particular convolution layer of the first neural network. It should be appreciated, however, that the neural network analyzer may process one or more or all convolution layers of the first neural network to determine groups of similar convolution kernels. Each group of convolution kernels includes only convolution kernels of a same convolution layer of the first neural network.

In one aspect, the neural network analyzer may form groups of similar convolution kernels using any of a variety of known clustering techniques intended for use in cases where the number of groups to be formed is not known at the outset. In general, the distance of a particular convolution kernel to the center of the group, or cluster, may be used as the similarity metric. An example method of implementing block 1005 is described in greater detail in connection with FIG. 11.

In block 1010, the neural network analyzer may determine a base convolution kernel for each group of similar convolution kernels. In one aspect, the base convolution kernel may be one of the convolution kernels of the group. For example, the neural network analyzer may calculate a base selection metric for each of the convolution kernels in a group. The neural network analyzer may utilize the base selection metric to select the base convolution kernel for the group from among the convolution kernels of the group.

In one example, the base selection metric may be a measure of the size of weights of the convolution kernels in the group. Since each convolution kernel of the group may be a scaled equivalent or an approximate equivalent, of each other member of the group, the neural network analyzer may select the convolution kernel with the smallest weights, the convolution kernel with the largest weights, or another convolution kernel with mid-level weights as the base convolution kernel for the group.

In illustration, consider an example group including convolution kernels K1, K2, and K3. In this example, convolution kernel K1 may have the smallest weights. Convolution kernel K2 may have weights of 2.3 times the weights of convolution kernel K1. Convolution kernel K3 may have weights that are 3 times the weights of convolution kernel K1. The neural network analyzer may select convolution kernel K1, convolution kernel K2, or convolution kernel K3 as the base convolution kernel depending upon the base selection metric.

In another example, the neural network analyzer may use mean weight as the base selection metric. For example, the neural network analyzer may select the convolution kernel with the largest mean weight as the base convolution kernel. Continuing with the prior example, convolution kernel K1 may have a mean component weight of 0.462. Convolution kernel K2 may have a mean component weight of 0.165. Convolution kernel K3 may have a mean component weight of 0.237. In this example, the neural network analyzer may select convolution kernel K1 as the base convolution kernel.

In another aspect, the base convolution kernel may be determined as a function of the convolution kernels of the group. For example, the neural network analyzer may determine an average, or weighted average, of the convolution kernels in the group. In the example group including convolution kernels K1, K2, and K3, the neural network analyzer may calculate an average of convolution kernels K1, K2, and K3 as the base convolution kernel. Other techniques may be used to determine a base convolution kernel. For instance, the base convolution kernel of a group of similar convolution kernels may be determined to minimize error. As an example, the base convolution kernel of a group may be determined such that the result is within a predetermined range of the result of applying the original separate convolutions. The inventive arrangements described herein are not intended to be limited by the particular examples provided for determining base convolution kernels for the groups.

In block 1015, the neural network analyzer may determine scaling factors for the convolution kernels in the groups. For each convolution kernel in a group, the neural network analyzer may calculate a scaling factor. The scaling factor is applied to the input feature map provided to the convolution kernel for which the scaling factor is determined. Scaling factor application is generally described with reference to FIG. 9 to generate the composite input feature map.

Consider the example where the group includes convolution kernels K1, K2, and K3. Convolution kernel K1 may have the smallest weights. Convolution kernel K2 may have weights of 2.3 times the weights of convolution kernel K1. Convolution kernel K3 may have weights that are 3 times the weights of convolution kernel K1. The neural network analyzer may select convolution kernel K1 as the base convolution kernel. In that case, the neural network analyzer determines the scaling factor for convolution kernel K1 to be 1 (or apply no scaling factor). The neural network analyzer determines the scaling factor for convolution kernel K2 as 2.3. The neural network analyzer determines the scaling factor for convolution kernel K3 to be 3. In an example where the neural network analyzer selects convolution kernel K3 as the base convolution kernel, the neural network analyzer may determine that the scaling factors to be applied to the input feature maps provided to convolution kernels K1, K2 and K3 may be ⅓, 1/2.3, and 1, respectively.

In still another example, where the neural network analyzer determines a base convolution kernel as an average or a weighted average of the convolution kernels K1, K2, and K3, the neural network analyzer may determine scaling factors to adjust some convolution kernel weights up and other convolution kernel weights down to reduce the average error.

In block 1020, the neural network analyzer may generate the second, or modified, neural network. For example, block 1020 may correspond to block 325 of FIG. 3. The neural network analyzer may modify the convolution layers, on a per group basis, to generate the input composite feature maps using the scaling factors and replace the convolution kernels of the group with a single instance of the base convolution kernel for the group. It should be appreciated that the base convolution kernel may be applied to the composite input feature map generated using the scaling factors in lieu of applying the plurality of convolution kernels of the group. A single instance of the base convolution kernel may be applied to the composite input feature map. As discussed, the neural network analyzer may perform the operations described in blocks 1005, 1010, 1015, and 1020 for a particular convolution layer, for a plurality of convolution layers, or across all convolution layers of the first neural network. The second neural network may be output and stored for subsequent use.

As noted with reference to FIG. 3, the neural network analyzer may optionally retrain the modified neural network. With regard to application of scaling, the neural network analyzer may retrain the second neural network with one or more constraints in place that prevent changes to the groups established as described with reference to FIG. 10. For example, the constraints may keep the established groups of similar convolution kernels intact. In this regard, membership of the groups in terms of which convolution kernels are in the various groups may remain unchanged. It should be appreciated, however, that some aspects of the groups such as the base convolution kernels (e.g., weights) and/or scaling factors may be modified without changing membership in the groups. As such, weights of base convolution kernels and/or scaling factors may be adjusted during a retraining process.

The retraining process may involve forward propagation and error back-propagation. For example, the neural network analyzer may enforce a constraint by implementing forward propagation using the base convolution kernel for the modified set of convolution kernels. The neural network analyzer may perform back-propagation so that the gradient descent has no effect on the constraint (i.e., base convolution kernel) while still updating the other convolution kernels.

In one embodiment, aggressiveness of the scaling process may be controlled through adjustment of the threshold used to determine whether convolution kernels are similar and, as such, within the same group. By increasing the threshold, for example, the neural network analyzer may generate fewer groups. Further, the number of operations required to compute convolutions will decrease proportionally.

As an illustrative example, consider the case where 128 input feature maps contribute to 128 output feature maps in the next convolution layer of the first neural network. The input feature maps that contribute to a particular output feature map may be grouped. The grouping of input feature maps may differ for each of the output feature maps. As such, in this case, there may be 128 different groupings of input feature maps (e.g., one grouping for each output feature map). In this example, 128 convolution kernels in the convolution layer of the neural network may be grouped into 32 groups. In that case, the number of convolutions required for the convolution layer in the modified neural network may be reduced by $32/128$ or ¼. Since approximately 80% of the mathematical operations in the first neural network are related to convolutions, the optimization described above may result in a reduction of approximately 60% of the mathematical operations performed to process the feature map for the second neural network.

Figure 11:
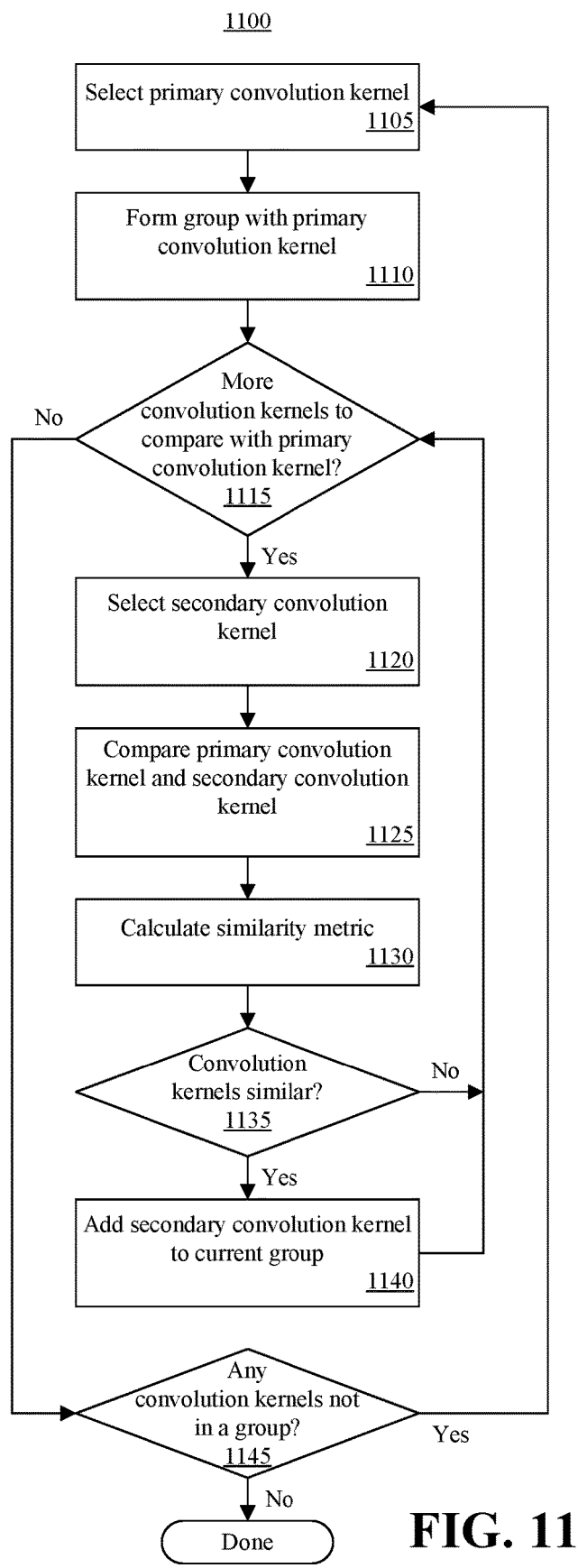
FIG. 11 is a flow chart illustrating an example method of determining groups of convolution kernels.

FIG. 11 is a flow chart illustrating an example method 1100 of determining groups of convolution kernels. As discussed, in one arrangement, FIG. 11 may be an example implementation of block 1005 of FIG. 10. FIG. 11 is described from the perspective of processing convolution kernels of a single convolution layer. It should be appreciated, however, that method 1100 may be performed in an iterative manner to process one or more other convolution layers of a neural network to determine groups.

In block 1105, the neural network analyzer may select a convolution kernel as a primary convolution kernel. The neural network analyzer may select a convolution kernel from the convolution kernels of a convolution layer to be the primary convolution kernel. The term "primary" is used only to differentiate one convolution kernel from another within the same convolution layer. In one aspect, the neural network analyzer may select a convolution kernel according to component size. For a given set of convolution kernels in a convolution layer, for example, the neural network analyzer may select one convolution kernel from the set according to component size. The primary convolution kernel may be used for purposes of grouping and determining convolution kernel similarity.

For example, a convolution layer of a neural network may include three convolution kernels K1, K2, and K3 that are to be applied to generate an output feature map for a next convolution layer of the first neural network. Convolution kernels K1, K2, and K3 are shown below in Tables 1, 2, and 3, respectively. In this example, the convolution kernels are 3×3.

TABLE 1

Convolution Kernel K1

| | | |
|---|---|---|
| 0.278 | 0.803 | 0.340 |
| 0.398 | 0.937 | 0.432 |
| 0.202 | 0.547 | 0.219 |

TABLE 2

Convolution Kernel K2

| | | |
|---|---|---|
| 0.099 | 0.290 | 0.111 |
| 0.152 | 0.318 | 0.165 |
| 0.072 | 0.203 | 0.074 |

TABLE 3

Convolution Kernel K3

| | | |
|---|---|---|
| 0.029 | 0.178 | 0.061 |
| 0.043 | 0.115 | 0.097 |
| 0.030 | 0.107 | 0.049 |

In one arrangement, the neural network analyzer may select the convolution kernel having the largest component size. In this example, the neural network analyzer may select convolution kernel K1 since the component 0.937 is larger than any other component of convolution kernels K2 and K3. Accordingly, in this example, convolution kernel K1 is selected as the primary convolution kernel.

In block 1110, the neural network analyzer may form a group with the primary convolution kernel. The neural network analyzer may create a new group that includes, at least initially, only the primary convolution kernel. In this example, the neural network analyzer may form a group that includes convolution kernel K1. In block 1115, the neural network analyzer may determine whether there are more convolution kernels that have not yet been compared with the primary convolution kernel. If so, method 1100 may continue to block 1120. If not, method 1100 may proceed to block 1145.

In block 1120, the neural network analyzer may select a secondary convolution kernel. The term "secondary" is only intended to differentiate one convolution kernel from another and from the primary convolution kernel. For purposes of illustration, the neural network analyzer may select convolution kernel K2 as the secondary convolution kernel. It should be appreciated, however, that the neural network analyzer may select any other convolution kernel of the convolution layer not yet compared with the primary convolution kernel and not yet placed into a group.

In block 1125, the neural network analyzer may compare the primary convolution kernel and the secondary convolution kernel. For example, the neural network analyzer may calculate a ratio of the primary convolution kernel to the secondary convolution kernel. Continuing with the prior example, the neural network analyzer may calculate a ratio of convolution kernel K1 (primary) to convolution kernel K2 (secondary) by dividing convolution kernel K1 by convolution kernel K2. The resulting ratio is shown below in Table 4.

TABLE 4

Convolution Kernel K1 divided by Convolution Kernel K2

| | | |
|---|---|---|
| 2.80 | 2.77 | 3.07 |
| 2.61 | 2.95 | 2.62 |
| 2.80 | 2.70 | 2.95 |

In block 1130, the neural network analyzer may calculate a similarity metric for the comparison made in block 1125. For example, the neural network analyzer may determine the similarity metric based, at least in part, on the ratio determined in block 1125. The similarity metric may be compared to a similarity criterion to determine whether the primary and secondary convolution kernels are similar. As an illustrative example, one or more metrics such as a mean, a minimum, a maximum, a standard deviation, or the like may be calculated for the ratio and used as the similarity metric. In another example, a combination of metrics may be used as the similarity metric. It should be appreciated that the neural network analyzer may use any of a variety of different metrics and/or combinations of such metrics to determine whether two convolution kernels are similar. Table 5 below illustrates example similarity metrics that may be calculated for the ratio of convolution kernel K1/convolution kernel K2.

TABLE 5

| Ratio | Mean | Min | Max | Standard Deviation |
|---|---|---|---|---|
| K1/K2 | 2.84 | 2.62 | 3.14 | 0.19 |

In block 1135, the neural network analyzer may determine whether the primary and secondary convolution kernels used to calculate the ratio are similar. The neural network analyzer may compare the similarity metric determined from the ratio with a similarity criterion to determine whether the convolution kernels are similar. The neural network analyzer may determine that each set of convolution kernels with a similarity metric that meets the similarity criterion are similar.

For purposes of illustration, the neural network analyzer may use standard deviation as the similarity metric and a threshold as the similarity criterion. The neural network analyzer may determine that the similarity metric meets the similarity criterion when the standard deviation of a ratio is less than or equal to the threshold. Continuing with the example above, the threshold may be set to 0.20. Accordingly, the neural network analyzer may determine that the primary convolution kernel K1 is related to the secondary convolution kernel K2 since the standard deviation of the ratio of convolution kernel K1 to convolution kernel K2 is 0.19 and less than 0.20.

If the neural network analyzer determines that the convolution kernels are similar, method 1100 may continue to block 1140. If not, method 1100 may loop back to block 1115 to continue comparing further convolution kernels of the convolution layer with the current primary convolution kernel. In block 1140, the neural network analyzer may add the secondary convolution kernel to the current group which is the group that includes the primary convolution kernel. Accordingly, the neural network analyzer adds convolution kernel K2 to the group that includes convolution kernel K1. After block 1140, method 1100 may loop back to block 1115 to continue processing.

In block 1115, the neural network analyzer may again determine whether there are more convolution kernels that have not yet been compared with the primary convolution kernel. In this example, the neural network analyzer may determine that convolution kernel K3 has not yet been compared with convolution kernel K1 and proceed to block 1120, where convolution kernel K3 may be selected as the secondary convolution kernel.

In block 1125, the neural network analyzer may calculate the ratio of convolution kernel K1 divided by convolution kernel K3. The calculated ratio is shown below as Table 6.

TABLE 6

| Convolution Kernel K1 divided by Convolution Kernel K3 | | |
|---|---|---|
| 7.61 | 6.63 | 5.54 |
| 6.40 | 6.38 | 7.61 |
| 7.42 | 9.56 | 6.49 |

In block 1130, the neural network analyzer may calculate the similarity metric for the ratio. For example, the neural network analyzer may determine that the ratio of convolution kernel K1 to convolution kernel K3 has a standard deviation of 1.09 and, as such, determine that the two convolution kernels are not similar in block 1135. Accordingly, the neural network analyzer does not add convolution kernel K3 to the current group, i.e., the group with convolution kernel K1 and convolution kernel K2.

In the next iteration through block 1115, the neural network analyzer may determine that there are no further convolution kernels available to compare with the primary convolution kernel. Accordingly, method 1100 may proceed to block 1145. In block 1145, the neural network analyzer may determine whether there are any convolution kernels of the convolution layer that are not yet assigned to a group. If so, method 1100 may loop back to block 1105 to select a convolution kernel not in a group as the primary convolution kernel. If the convolution kernels of the convolution layer are all in groups, method 1100 may end.

In looping back to block 1105, and continuing with the example, the neural network analyzer may select convolution kernel K3 as the primary convolution kernel. In one arrangement, the neural network analyzer may use the same selection criteria as previously used to select the primary convolution kernel. For example, the neural network analyzer may select the convolution kernel not yet in a group with the largest component.

In block 1110, the neural network analyzer may form a group that includes convolution kernel K3. In block 1115, the neural network analyzer may determine that there are no other convolution kernels to compare with the primary convolution kernel and proceed to block 1145. In block 1145, since all of the convolution kernels have been assigned to groups, method 1100 may end.

Using the example weights for convolution kernels K1 and K2 from Tables 1 and 2, the neural network analyzer may calculate scaling factors as described with reference to block 1015 of FIG. 10. In this example, since convolution kernel K1 is used as the base convolution kernel, the neural network analyzer need only calculate a scaling factor for convolution kernel K2. The neural network analyzer may calculate a scaling factor of 0.3513 for convolution kernel K2. For purposes of illustration, taking base convolution kernel K1 and scaling the components using the scaling factor of 0.3513 results in an approximation of convolution kernel K2 shown below in Table 7.

TABLE 7

| Approximation of Convolution Kernel K2 | | |
|---|---|---|
| 0.098 | 0.284 | 0.120 |
| 0.141 | 0.332 | 0.153 |
| 0.071 | 0.194 | 0.078 |

By applying the scaling factor to the input feature map provided to convolution kernel K2, the contribution of convolution kernel K2 can be accounted for in the composite input feature map. The accuracy of the approximation of using the scaling factor for convolution kernel K2 and the base convolution kernel for the group is shown below in Table 8.

TABLE 8

| | | |
|---|---|---|
| 98.0% | 104.0% | 104.0% |
| 94.9% | 91.4% | 107.5% |
| 96.1% | 104.9% | 99.2% |

As noted, groups may be formed using a clustering technique. The example provided in FIG. 11 is not intended to limit the inventive arrangements described within this disclosure to one particular type of clustering technique. In another example, the neural network analyzer may compare new candidate convolution kernels to the weighted average of the existing group rather than to the primary kernel. With reference to the example of FIG. 11, the primary convolution is likely to be the logical centroid of the cluster. Accordingly, comparison of the secondary convolution kernel to the primary convolution kernel is an example of using the similarity criterion and/or metric of distance to the group center.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or other similar examples.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), a graphics processing unit (GPU), an array processor, a vector processor, a digital signal processor (DSP), a field-programmable gate array (FPGA), a programmable logic array (PLA), an application specific integrated circuit (ASIC), programmable logic circuitry, a controller, etc.

As defined herein, the term "real-time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of tuning a neural network, the method comprising:
    selecting a portion of a first neural network for modification to alter one or more target performance requirements;
    generating, using a processor, a second neural network based upon the first neural network by modifying the selected portion of the first neural network while executing neither the first neural network nor the second neural network; and
    validating, by the processor, that an operation of the second neural network achieves at least a selected set of the target performance requirements.

2. The method of claim 1, further comprising:
    receiving data indicative of the target performance requirement(s);
    wherein the data indicative of the target performance requirement(s) includes an indication of a preference between a first target performance requirement and a second target performance requirement; and
    wherein modifying of the selected portion of the first neural network includes altering the selected portion such that the first target performance requirement is more successfully met than the second target performance requirement.

3. The method of claim 1, further comprising:
    receiving data indicative of the first neural network; and
    in response to receiving a request to modify the first neural network, automatically performing the selecting of the portion of the first neural network and the generating of the second neural network.

4. The method of claim 1, further comprising:
    retraining the second neural network.

5. The method of claim 1, wherein the operation of the second neural network further comprises, if the operation of the second neural network does not achieve the selected set of the target performance requirements,
    iteratively generating at least one new version of the second neural network, based upon additional modifications to the selected portion of the first neural network.

6. The method of claim 1, wherein the selected portion of the first neural network comprises weights and the modifying the selected portion of the first neural network comprises:

adjusting selected ones of the weights of the selected portion of the first neural network.

7. The method of claim 6, wherein adjusting selected ones of the weights of the selected portion of the first neural network comprises:

replacing a convolution kernel of a layer of the first neural network with a replacement convolution kernel.

8. The method of claim 6, wherein adjusting selected ones of the weights of the selected portion of the first neural network comprises:

scaling a convolution kernel of the first neural network.

9. The method of claim 1, wherein the modifying the selected portion of the first neural network includes performing an operation selected from the group consisting of convolution kernel substitution, pruning, decomposition, and scaling.

10. The method of claim 1, wherein the modifying the selected portion of the first neural network comprises:

pruning the portion of the first neural network.

11. The method of claim 10, wherein pruning the portion of the first neural network comprises performing an operation selected from the group consisting of using a different numerical format for weights of the first neural network, removing a feature map of a layer of the first neural network, zeroing a convolution kernel of the first neural network, and removing a layer of the first neural network.

12. The method of claim 1, wherein the modifying the selected portion of the first neural network comprises:

replacing an activation function of a neuron of the selected portion of the first neural network with a different activation function.

13. The method of claim 1, wherein the modifying the selected portion of the first neural network comprises:

decomposing a convolution kernel of the selected portion of the first neural network.

14. The method of claim 1, wherein the modifying the selected portion of the first neural network comprises:

performing kernel fusion.

* * * * *